No. 875,692. PATENTED JAN. 7, 1908.
L. L. CONKEY.
VETERINARY DENTAL SPECULUM.
APPLICATION FILED DEC. 26, 1906.

Witnesses
Georgiana Chase
Palmer A. Jones

Inventor
Leonard L. Conkey
by Luther V. Moulton
Attorney

UNITED STATES PATENT OFFICE.

LEONARD L. CONKEY, OF GRAND RAPIDS, MICHIGAN.

VETERINARY DENTAL SPECULUM.

No. 875,692.  Specification of Letters Patent.  Patented Jan. 7, 1908.

Application filed December 26, 1906. Serial No. 349,430.

*To all whom it may concern:*

Be it known that I, LEONARD L. CONKEY, a citizen of the United States of America, residing at Grand Rapids, in the county of Kent and State of Michigan, have invented certain new and useful Improvements in Veterinary Dental Specula; and I do hereby declare the following to be a full, clear, and exact description of the invention, such as will enable others skilled in the art to which it appertains to make and use the same.

Figure 1:
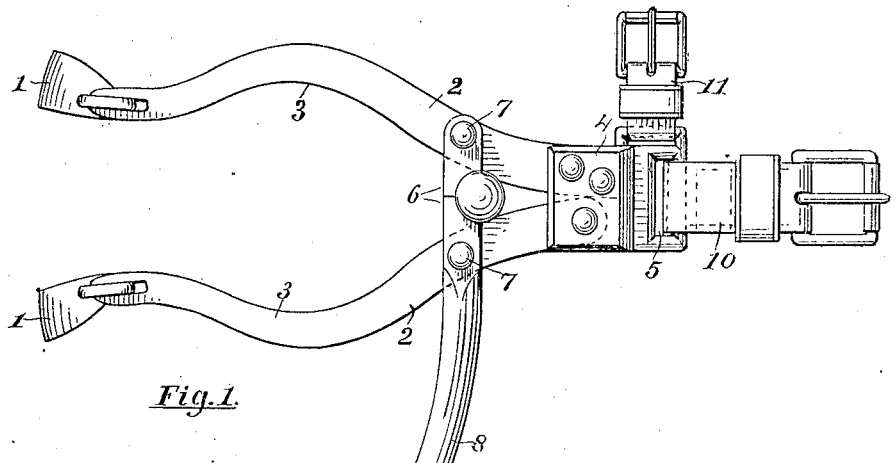
Figure 2:
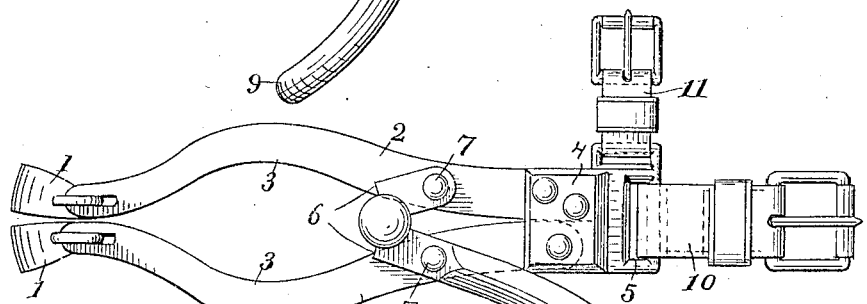
Figure 3:
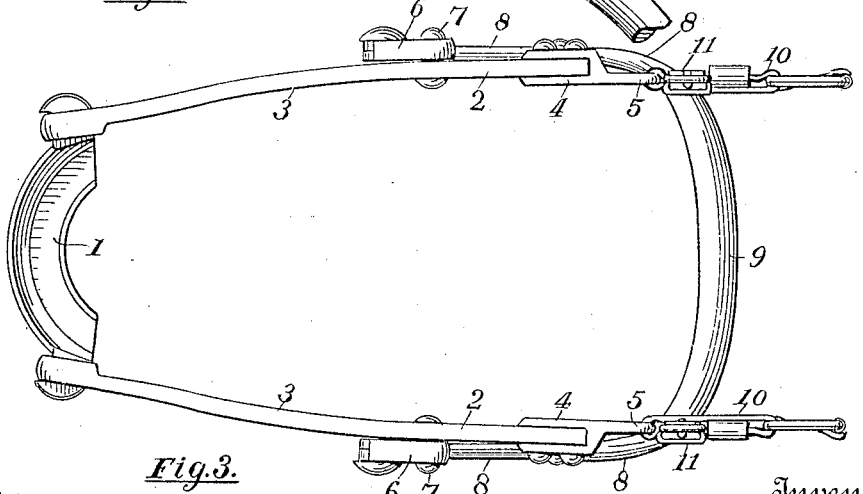

My invention relates to improvements in veterinary dental specula, and its object is to provide the same with various new and useful features hereinafter more fully described and particularly pointed out in the claims, reference being had to the accompanying drawings, in which:

Figure 1. is a side elevation of a device embodying my invention shown in open position as when in use; Fig. 2. the same shown in closed position; and, Fig. 3. a plan view of the same.

Like numbers refer to like parts in all of the figures.

1—1 represents two segmental flanged plates adapted to engage the respective upper and lower teeth of an animal to force the mouth of the animal open and to hold it in such position. These plates are mounted on the relatively movable ends of arms 2, arranged in upper and lower pairs at the respective sides of the device, to extend at the respective sides of the jaws of the animal. For ready access to the mouth when open, these arms are oppositely curved away from each other as at 3. 4 represents hinge-members rigidly attached to the upper arms 2, to which members the ends of the lower arms 2 are pivoted.

In each hinge-member 4 is an opening 5 in which is inserted a strap 10 to secure the device in place upon the animal. To further secure the device and to vertically adjust the rear of the same, a front strap 11 is also provided, which latter is attached to the hinge member near the head strap 10. To move the arms apart and hold the same in adjusted position, I provide levers (toggle levers 6 being preferred) which levers connect these arms near the hinge and are pivoted to said arms as at 7 and provided with a rule joint midway between said pivots, whereby as these levers are turned to a right line between these pivots, the lower arms are moved away from the upper arms about pivots which connect them to the hinge members. These toggle levers at each side are extended downward and forward as at 8 and connected transversely at their lower ends as at 9 forming a connected handle or loop whereby the levers are manipulated. These levers 9 thus form a suitable hand hold for the operator, and when the toggle levers are in line and the shoulders of the rule joint engaged, form a rigid downwardly projecting handle to hold the head of the animal and manually control the same.

What I claim is:

1. A device of the class described, comprising an upper plate, a pair of upper arms supporting said plate at one end, a lower plate, a pair of lower arms supporting said lower plate at one end and pivoted to the respective upper arms at the other end, toggle levers pivotally connected to the adjacent upper and lower arms at each side and provided with a rule joint between said arms, and a U-shaped downward extension connecting said levers.

2. A device of the class described comprising an upper plate, a pair of upwardly curved arms supporting the same at one end, hinge members attached to the other ends of said arms, straps attached to said hinge members, a lower plate, a pair of downwardly curved lower arms supporting said lower plate at one end and pivoted to said hinge members at the other end, toggle levers having rule joints and pivotally connected to the opposing upper and lower arms, and a U-shaped downward extension to said levers and connecting the same.

3. In a device of the class described, an upper plate, a pair of upwardly curved upper arms supporting said plate at one end, hinge members rigidly attached to the other ends of said arms, straps attached to said hinge members, a lower plate, a pair of downwardly curved lower arms supporting said lower plate, at one end and pivoted to the hinge member at the other end, toggle levers pivotally connected to the adjacent upper and lower arms and having rule joints midway between their pivots, and a downwardly and forwardly curved extension to said levers and connecting the same.

4. In a device of the class described, an upper plate, an upper pair of arms supporting said plate at one end, hinge members rigidly attached to the other ends of said arms, rearwardly projecting straps attached to said hinge members, upwardly projecting straps also attached to said hinge members, a lower plate, a pair of arms supporting said lower plate at one end and pivoted to the hinge members at the other end, toggle levers having rule joints and connecting the opposite upper and lower arms to adjust and hold the same, and a U-shaped downwardly projecting extension connecting said levers.

In testimony whereof I affix my signature in presence of two witnesses.

LEONARD L. CONKEY.

Witnesses:
   LUTHER V. MOULTON,
   PALMER A. JONES.